United States Patent
Herold et al.

(10) Patent No.: US 10,351,962 B2
(45) Date of Patent: Jul. 16, 2019

(54) METHOD FOR OPERATING AN ELECTROLYTIC SYSTEM AND ELECTROLYTIC SYSTEM

(71) Applicant: Siemens Aktiengesellschaft, Munich (DE)

(72) Inventors: Jochen Herold, Weismain (DE); Martin Kautz, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 215 days.

(21) Appl. No.: 15/323,469

(22) PCT Filed: Jun. 29, 2015

(86) PCT No.: PCT/EP2015/064722
§ 371 (c)(1),
(2) Date: Jan. 3, 2017

(87) PCT Pub. No.: WO2016/001155
PCT Pub. Date: Jan. 7, 2016

(65) Prior Publication Data
US 2017/0145570 A1   May 25, 2017

(30) Foreign Application Priority Data
Jul. 1, 2014   (DE) .................. 10 2014 212 718

(51) Int. Cl.
*C25B 1/12* (2006.01)
*C25B 9/00* (2006.01)
(Continued)

(52) U.S. Cl.
CPC .................. *C25B 1/12* (2013.01); *C25B 9/00* (2013.01); *C25B 15/02* (2013.01); *C25B 15/08* (2013.01); *Y02E 60/366* (2013.01)

(58) Field of Classification Search
CPC ........................................................ C25B 1/12
See application file for complete search history.

(56) References Cited

U.S. PATENT DOCUMENTS

| | | | |
|---|---|---|---|
| 4,107,277 A | 8/1978 | Da Rosa | 423/359 |
| 4,530,744 A | 7/1985 | Smith | 205/338 |

(Continued)

FOREIGN PATENT DOCUMENTS

| | | | |
|---|---|---|---|
| DE | 102005011316 A1 | 10/2006 | C25B 1/04 |
| EP | 2138678 A1 | 12/2009 | C25B 1/12 |
| WO | 2016/001155 A1 | 1/1916 | C25B 1/12 |

OTHER PUBLICATIONS

German Office Action, Application No. 102014212718.1, 5 pages, dated Apr. 13, 2015.

(Continued)

*Primary Examiner* — Nicholas A Smith
(74) *Attorney, Agent, or Firm* — Slayden Grubert Beard PLLC

(57) ABSTRACT

A method for operating and electrolytic system may include an electrolyzer for generating hydrogen and oxygen as product gas. Hydrogen and oxygen produced during the electrolytic process are discharged from the electrolyzer. As a result, the efficiency of the electrolytic system is improved, at least one of the product gases in the expansion turbine is expanded, and a generator is driven by the expansion turbine.

12 Claims, 1 Drawing Sheet

(51) Int. Cl.
*C25B 15/02* (2006.01)
*C25B 15/08* (2006.01)

(56) References Cited

U.S. PATENT DOCUMENTS

| | | | |
|---|---|---|---|
| 9,464,357 B2* | 10/2016 | Herold | C25B 15/08 |
| 2006/0065214 A1 | 3/2006 | Flessner et al. | 123/3 |
| 2010/0025232 A1 | 2/2010 | Kelly | 204/194 |
| 2011/0081586 A1 | 4/2011 | Mcalister | 429/422 |

OTHER PUBLICATIONS

International Search Report and Written Opinion, Application No. PCT/EP2015/064722, 21 pages, dated Sep. 15, 2015.

* cited by examiner

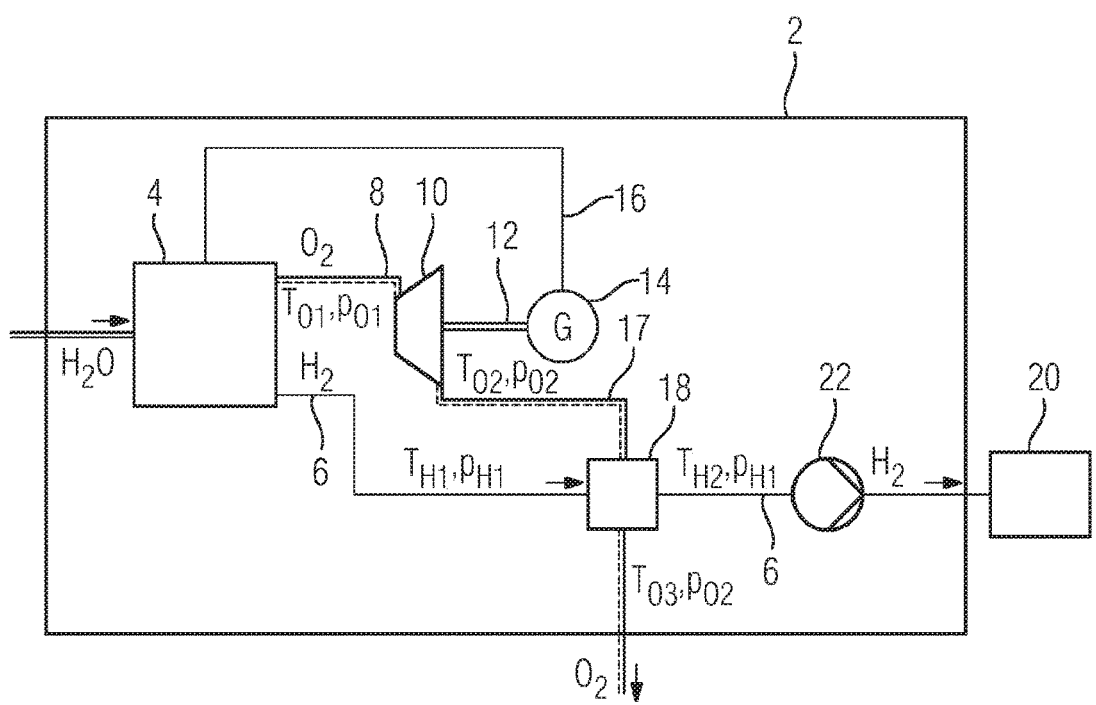

METHOD FOR OPERATING AN ELECTROLYTIC SYSTEM AND ELECTROLYTIC SYSTEM

CROSS-REFERENCE TO RELATED APPLICATIONS

This application is a U.S. National Stage Application of International Application No. PCT/EP2015/064722 filed Jun. 29, 2015, which designates the United States of America, and claims priority to DE Application No. 10 2014 212 718.1 filed Jul. 1, 2014, the contents of which are hereby incorporated by reference in their entirety.

TECHNICAL FIELD

The invention relates to a method for operating an electrolytic system, in particular a high pressure electrolytic system, comprising an electrolyzer for producing hydrogen and oxygen as product gases, wherein the hydrogen and oxygen produced in the electrolysis process are discharged from the electrolyzer.

Furthermore, the invention relates to an electrolytic system, in particular a high pressure electrolytic system, comprising an electrolyzer for producing hydrogen and oxygen as product gases, further comprising a hydrogen line for discharging the hydrogen produced in the electrolysis process, as well as an oxygen line for discharging the oxygen produced in the electrolysis process.

BACKGROUND

Hydrogen is nowadays produced by means of PEM electrolysis, as an example. A component of a PEM electrolyzer is a polymer membrane which is permeable to protons (proton exchange membrane), both sides of which being in contact with porous platinum electrodes (anode and cathode). An external voltage is applied to them and water is supplied to the anode side of the electrolyzer. The catalytic action of the platinum breaks down the water on the anode side. Oxygen, free electrons and positively charged hydrogen ions, $H^+$, are thus produced. The hydrogen ions $H^+$ diffuse through the proton exchange membrane to the cathode side where they combine with electrons from the external circuit to form hydrogen molecules, $H_2$.

Splitting water into hydrogen and oxygen by electrolysis opens up the possibility of storing surplus electricity in the form of hydrogen or oxygen. Following the reaction, most of the electrical energy that has been introduced is recovered in the chemical energy of the hydrogen and oxygen products. However, in addition to the hydrogen and oxygen products, losses also occur in the electrolysis process that are incurred in the form of heat of reaction. In this connection, it should be noted that during the electrolysis, a considerable amount of electrical energy is converted into heat energy or waste heat, which at the present time is for the most part dissipated and not put to use. This is largely because the amount of waste heat varies widely from a relatively low temperature of approximately 30° C. up to 80° C.

DE 10 2005 011 316 A1, as an example, discloses that the heat of the hydrogen and oxygen streams produced in the electrolyzer is given up to preheat the water required for the electrolysis.

SUMMARY

One embodiment provides a method for operating an electrolytic system, e.g., a high pressure electrolytic system, comprising an electrolyzer for producing hydrogen and oxygen as product gases, wherein the hydrogen and oxygen produced in the electrolysis process are discharged from the electrolyzer, wherein at least one of the product gases is decompressed in a decompression turbine, wherein a generator is driven by the decompression turbine and wherein the decompression turbine is used to regulate the pressure level in the electrolyzer.

In one embodiment, the electric current produced by the generator is supplied to the electrolyzer.

In one embodiment, a respective decompression turbine is provided to decompress the hydrogen and the oxygen.

In one embodiment, cooled product gas is used as the cold stream for the decompression in the decompression turbine.

In one embodiment, the oxygen is decompressed and used as cold oxygen to precool the hydrogen.

In one embodiment, the oxygen is cooled upstream of the decompression turbine.

Another embodiment provides an electrolytic system, e.g., a high pressure electrolytic system, comprising an electrolyzer for producing hydrogen and oxygen as product gases, further comprising a hydrogen line for discharging the hydrogen produced in the electrolysis process, as well as an oxygen line for discharging the oxygen produced in the electrolysis process, wherein at least one decompression turbine is provided to decompress at least one of the product gases, wherein a generator is connected downstream of the decompression turbine in order to produce electric current and wherein the decompression turbine is provided in order to regulate the pressure level of the electrolyzer.

In one embodiment, an electric line is provided to supply the electric current generated in the generator to the electrolyzer.

In one embodiment, a respective decompression turbine is provided in each of the hydrogen line and the oxygen line.

In one embodiment, a cold line is provided downstream of the decompression turbine for further applications of the cooled product gas.

In one embodiment, the decompression turbine is disposed on the oxygen line and a cold oxygen line is provided downstream of the decompression turbine, which is fluidically connected with the hydrogen line.

In one embodiment, cooling equipment is disposed on the oxygen line.

BRIEF DESCRIPTION OF THE DRAWINGS

Example aspects of the invention are discussed below with reference to the sole figure, FIG. 1, which shows an example configuration of an electrolytic system comprising a PEM high pressure electrolyzer for producing the product gases hydrogen and oxygen from water, according to one example embodiment.

DETAILED DESCRIPTION

Embodiments of the invention may increase the efficiency of an electrolytic system.

Some embodiments provide a method for operating an electrolytic system, e.g., a high pressure electrolytic system, comprising an electrolyzer, in particular a PEM electrolyzer, for producing hydrogen and oxygen as product gases, wherein the hydrogen and oxygen produced in the electrolysis process are discharged from the electrolyzer, wherein at least one of the product gases is decompressed in a decompression turbine, wherein a generator is driven by the decompression turbine and wherein the decompression turbine (10) is used to regulate the pressure level in the electrolyzer (4).

Other embodiments provide an electrolytic system, e.g., a high pressure electrolytic system, comprising an electrolyzer, in particular a PEM electrolyzer, for producing hydrogen and oxygen as product gases, further comprising a hydrogen line for discharging the hydrogen produced in the electrolysis process, as well as an oxygen line for discharging the oxygen produced in the electrolysis process, wherein at least one decompression turbine is provided to decompress at least one of the product gases, wherein a generator is connected downstream of the decompression turbine in order to produce electric current and wherein the decompression turbine is provided in order to regulate the pressure level of the electrolyzer.

The example advantages and embodiments described below with respect to the method are of analogous application to the electrolytic system.

Embodiments of the invention are based on the concept of exploiting the pressure energy of at least one of the product gases, oxygen or hydrogen, in order to generate electric current. A turbine has the essential advantage in this regard that it can react very quickly to changes in load. Thus, when the volume of gas changes, then the performance of the turbine can immediately be adjusted.

The decompression turbine is also used to regulate the pressure level in the electrolyzer. At the present time, as an example, decompression valves are used to regulate the pressure. By regulating the pressure level by means of the decompression turbine, which allows for very quick and flexible pressure changes, the decompression valve can be dispensed with.

In one embodiment, the electric current produced by the generator is fed to the electrolyzer via an electrical line. This has the advantage that the generator disposed on a shaft with the turbine does not have to satisfy any conditions as regards the quality of the current (frequency, noise, etc.). In this manner, the electrical efficiency of a PEM electrolyzer can be improved by approximately 4%.

In order to increase the efficiency of the electrolytic system, in some embodiments both the hydrogen and the oxygen are decompressed, wherein a respective decompression turbine is provided to decompress the hydrogen and the oxygen, disposed appropriately in the hydrogen line and the oxygen line. This is in particular the case for large-scale plants or hydrogen filling stations.

With a view to improving the efficiency of the systems by means of thermal integration of a refrigerating capacity, e.g., the product gas that is cooled during the decompression in the decompression turbine is used as a cold stream, for example by recycling it to the electrolyzer or by carrying out a heat exchange in order to cool the other product gases. Alternatively or as a supplement to using the refrigeration from cooling the product gas by decompression internally, utilizing the refrigeration remotely from the electrolytic system may also be envisaged.

Advantageously, the oxygen is decompressed and used as cold oxygen to precool the hydrogen. This is carried out in the system by disposing the decompression turbine on the oxygen line and providing a cold oxygen line downstream of the decompression turbine that is fluidically connected with the hydrogen line. The term "fluidically connected" as used here should be understood to mean that an exchange of heat occurs between both product gases. A transfer of material, for example in that both gas streams are combined, is not intended. Cooling of the hydrogen by the decompressed oxygen is particularly advantageous when using the electrolytic system at car and/or truck hydrogen filling stations because the cold oxygen serves to precool the still-compressed hydrogen in order to compress it further more effectively.

Appropriately, the oxygen is cooled upstream of the decompression turbine, by disposing cooling equipment in the oxygen line. Precooling the compressed oxygen means that lower temperatures can be obtained after decompression, or a better refrigerating capacity in the downstream applications can be obtained.

An exemplary example of the invention will now be explained in more detail.

FIG. 1 shows an exemplary configuration of an electrolytic system 2 comprising a PEM high pressure electrolyzer 4 for producing the product gases hydrogen, $H_2$ and oxygen, $O_2$ from water, $H_2O$. A hydrogen line 6 and an oxygen line 8 are provided in order to discharge the product gases.

In the exemplary embodiment shown, a decompression turbine 10 is disposed on the oxygen line 8. The decompression turbine 10 is coupled to a generator 14 via a shaft 12; the generator generates electric current upon decompression of the oxygen product gas. The electric current generated by the generator 14 is supplied to the electrolyzer 4 via an electrical line 16 in order to carry out the electrolysis process. However, it is also possible to supply the electric current to a power grid for external applications remote from the electrolytic system 2.

Upstream of the decompression turbine 10, the oxygen in the oxygen line 8 has a first temperature $T_{o1}$ and a first pressure $p_{o1}$. Downstream of the decompression turbine 10, the oxygen is cooled to a second temperature $T_{o2}$ and its pressure is reduced to a second pressure $p_{o2}$. Thus, $T_{o1} > T_{o2}$ and $p_{o1} > p_{o2}$. The decompression turbine 10 thus replaces a pressure regulating valve and also takes over the function of regulating the pressure level of the PEM high pressure electrolyzer 4.

In the exemplary embodiment shown, a heat exchanger 18 is integrated into the oxygen line 8 downstream of the decompression turbine 10. The cold oxygen in a cold line 17 thereby forms the secondary circuit of the heat exchanger 18. On the primary circuit side, hydrogen from the PEM high pressure electrolyzer 4 is introduced into the heat exchanger 18 via the hydrogen line 6.

Upstream of the heat exchanger 18, the hydrogen is at a first temperature $T_{H1}$ and at a first pressure $p_{H1}$. Because heat is given up in the heat exchanger 18, the temperature of the hydrogen downstream of the heat exchanger 18 drops to a second temperature $T_{H2}$. The pressure of the hydrogen downstream of the heat exchanger 18 remains essentially unchanged, at $p_{H1}$.

Similarly, the pressure level of the oxygen downstream of the heat exchanger 18 remains at $p_{o2}$, however the temperature of the oxygen rises to $T_{o3}$ in the heat exchanger 18.

After the temperature of the hydrogen in the hydrogen line 6 has dropped, the hydrogen is compressed by means of a compressor 22 for use in a hydrogen filling station which is symbolically represented by the block 20.

In the electrolytic system 2 shown in the figure, the refrigerating capacity of the decompressed oxygen is used to precool the hydrogen, in particular before it is compressed for use in the hydrogen filling station 20.

Disposing cooling equipment in the oxygen line may also be envisaged, but is not shown, in order to obtain a lower temperature $T_{o1}$, whereupon in particular the refrigerating capacity in the heat exchanger 18 is increased.

In the exemplary embodiment shown, a decompression turbine 10 is provided solely to decompress the oxygen stream. It is also alternatively possible to integrate a further decompression turbine 10 for the hydrogen stream into the hydrogen line 6, or applications for the electrolytic system 2 may also be envisaged wherein only the hydrogen stream is decompressed. It is also possible to decompress the compressed hydrogen stream arising from the electrolysis by means of a turbine, whereupon the electric current obtained thereby can be consumed in the electrolyzer 4 or remotely therefrom.

What is claimed is:

1. A method for operating a high pressure electrolytic system, comprising:
   using an electrolyzer to produce hydrogen and oxygen as product gases,
   discharging the hydrogen and oxygen produced in the electrolysis process from the electrolyzer,
   decompressing a first product gas in a decompression turbine,
   driving a generator with the decompression turbine,
   using the decompression turbine to regulate a pressure level in the electrolyzer,
   directing the decompressed first product gas into a heat exchanger,
   cooling a second product gas in the heat exchanger, and
   compressing the second product gas after it exits the heat exchanger.

2. The method of claim 1, comprising supplying the electric current produced by the generator to the electrolyzer.

3. The method of claim 1, comprising decompressing the hydrogen and oxygen produced in the electrolysis process in the decompression turbine.

4. The method of claim 1, comprising using cooled product gas as a cold stream for decompression in the decompression turbine.

5. The method of claim 1, comprising decompressing and using the oxygen as cold oxygen to precool the hydrogen.

6. The method of claim 1, comprising cooling the oxygen upstream of the decompression turbine.

7. A high pressure electrolytic system, comprising:
   an electrolyzer configured to produce hydrogen and oxygen as product gases,
   a hydrogen line configured to discharge the hydrogen produced in the electrolysis process,
   an oxygen line configured to discharge the oxygen produced in the electrolysis process,
   at least one decompression turbine configured to decompress a first one of the product gases,
   a generator connected downstream of the decompression turbine and configured to produce electric current,
   a heat exchanger receiving the decompressed first one of the product gases and cooling a second one of the product gases, and
   a compressor pressurizing the second one of the product gases after it has been cooled,
   wherein the decompression turbine is configured to regulate a pressure level of the electrolyzer.

8. The electrolytic system of claim 7, comprising an electric line configured to supply the electric current generated in the generator to the electrolyzer.

9. The electrolytic system of claim 7, wherein the at least one decompression turbine comprises a respective decompression turbine in each of the hydrogen line and the oxygen line.

10. The electrolytic system of claim 7, comprising a cold line located downstream of the decompression turbine for further applications of the cooled product gas.

11. The electrolytic system of claim 7, wherein the decompression turbine is disposed on the oxygen line, and a cold oxygen line is provided downstream of the decompression turbine and fluidically connected with the hydrogen line in the heat exchanger.

12. The electrolytic system of claim 7, wherein cooling equipment is disposed on the oxygen line.

* * * * *